United States Patent
Vlaiko

(10) Patent No.: US 9,229,502 B2
(45) Date of Patent: Jan. 5, 2016

(54) FAST WAKE-UP OF DIFFERENTIAL RECEIVERS USING COMMON MODE DECOUPLING CAPACITORS

(71) Applicant: Apple Inc., Cupertino, CA (US)

(72) Inventor: Julian Vlaiko, Kfar Saba (IL)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 13/649,759

(22) Filed: Oct. 11, 2012

(65) Prior Publication Data

US 2013/0268784 A1    Oct. 10, 2013

Related U.S. Application Data

(60) Provisional application No. 61/620,961, filed on Apr. 5, 2012.

(51) Int. Cl.
*G06F 1/26* (2006.01)
*G06F 1/32* (2006.01)
*H04L 12/12* (2006.01)

(52) U.S. Cl.
CPC ............... *G06F 1/26* (2013.01); *G06F 1/3203* (2013.01); *G06F 1/3209* (2013.01); *H04L 12/12* (2013.01); *Y02B 60/34* (2013.01)

(58) Field of Classification Search
CPC ............. G06F 1/00; G06F 1/04; G06F 1/12; G06F 1/26; G06F 1/32; G06F 11/30; G06F 15/16
USPC .................................. 713/300, 310, 148
See application file for complete search history.

(56) References Cited

U.S. PATENT DOCUMENTS

| | | | | |
|---|---|---|---|---|
| 4,605,870 A | * | 8/1986 | Dansky et al. | 326/127 |
| 5,612,607 A | * | 3/1997 | Nicolai | 320/148 |
| 5,815,034 A | * | 9/1998 | Takahashi | 327/563 |
| 7,348,805 B2 | | 3/2008 | Cannon et al. | |
| 7,460,966 B1 | * | 12/2008 | Hattori | 702/61 |
| 7,511,554 B2 | | 3/2009 | Kaneko et al. | |
| 7,737,732 B2 | | 6/2010 | Lee | |
| 7,978,755 B2 | | 7/2011 | Vorenkamp | |
| 8,432,019 B2 | * | 4/2013 | Tsu et al. | 257/532 |
| 2007/0103001 A1 | * | 5/2007 | Chiozzi et al. | 307/10.1 |
| 2009/0027012 A1 | * | 1/2009 | Umetsu et al. | 320/148 |
| 2010/0105319 A1 | | 4/2010 | Yeung et al. | |
| 2011/0221483 A1 | * | 9/2011 | Liu et al. | 327/142 |

* cited by examiner

*Primary Examiner* — Thomas Lee
*Assistant Examiner* — Mohammad A Rahman
(74) *Attorney, Agent, or Firm* — Meyertons, Hood, Kivlin, Kowert & Goetzel, P.C.

(57) ABSTRACT

Embodiments of an AC coupled bus charging system are disclosed that may allow for different charging currents. The charging system may include a charging circuit and a control circuit. The charging circuit may be operable to controllably select different charging currents dependent upon the output of the control circuit.

23 Claims, 8 Drawing Sheets

FAST WAKE-UP OF DIFFERENTIAL RECEIVERS USING COMMON MODE DECOUPLING CAPACITORS

PRIORITY CLAIM

This application claims benefit of priority of U.S. Provisional Patent Application Ser. No. 61/620,961, filed on Apr. 5, 2012, which is incorporated by reference herein in its entirety.

BACKGROUND

1. Technical Field

This invention is related to the field of high-speed interface design, and more particularly to AC coupling techniques.

2. Description of the Related Art

Computing systems typically include a number of interconnected integrated circuits. In some cases, the integrated circuits may communicate through parallel interfaces, which simultaneously communicate multiple bits of data. In other cases, the integrated circuits may employ a serial interface, which sequentially communicates one bit of data at a time. For both parallel and serial interfaces, communicated data may be differentially encoded.

In a computing system, the integrated circuits may have different power supply requirements, which may result in different output voltages being coupled to the integrated circuits' respective communication ports. Furthermore, variations in the properties of wiring traces on circuit boards as well as differences in power supply performance, may further contribute to differences in the power supply voltages supplied to the integrated circuits.

In some cases, each integrated circuit may be coupled to an interface through a series capacitor to remove the DC component of a transmitted or received signal, allowing only the high frequency portion of the transmitted or received signal to pass. During power-up, it may be necessary to charge the series capacitor to a voltage level sufficient to transceiver circuits to operate properly.

SUMMARY OF THE EMBODIMENTS

Various embodiments of a bus charging circuit are disclosed. Broadly speaking, a system and method are contemplated in which a bus charging circuit may source a rapid charge current or a trickle charge current to a capacitively coupled input/output port of an integrated circuit.

In one embodiment, a control circuit may generate a current control signal dependent upon a power-up signal. A charging circuit may then source a rapid charge current or a trickle charge current to a capacitively coupled input/output port of an integrated circuit dependent upon the current control signal.

In a specific embodiment, the control circuit may be further configured to select the trickle charge current after a delay period from the assertion of the power-up signal.

BRIEF DESCRIPTION OF THE DRAWINGS

The following detailed description makes reference to the accompanying drawings, which are now briefly described.

Figure 1:
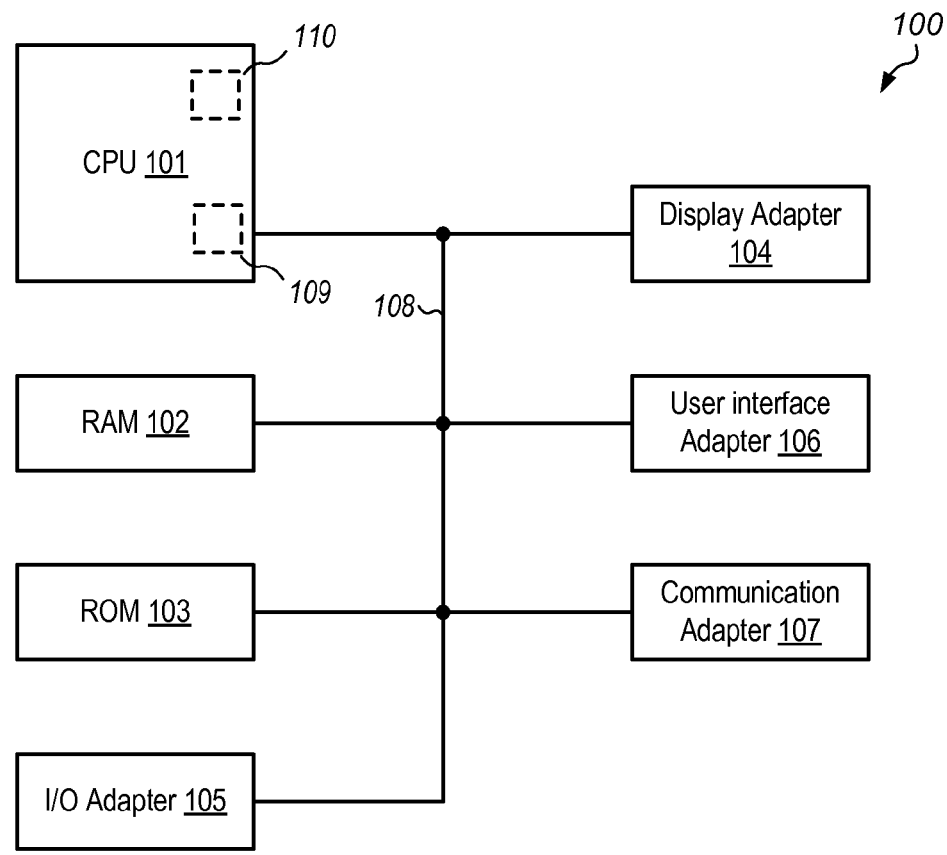
FIG. 1 illustrates an embodiment of a computing system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A computing system may include one or more integrated circuits, such as, e.g., a central processing unit (CPU). Each one of the integrated circuits may communicate through either a serial or parallel interface. In a parallel interface, multiple data bits are communicated simultaneously, while in a serial interface, data is communicated as a series of sequential single data bits. Due to differences in semiconductor process technology and circuit performance requirements, different integrated circuits may require different supply voltages, which may result in different DC bias being applied to data transmitted via either a serial or parallel interface. In some cases, series capacitors are employed between integrated circuits along the interface wiring to remove the DC bias from the transmitted data, allowing only a high frequency component to pass from one integrated circuit to another. To properly detect such data, it may be necessary for an integrated circuit to apply a new DC level to the transmitted high frequency component such that it is properly biased at the preferred DC operating point of an input amplifier. During power-up, it may be necessary to rapidly apply the aforementioned DC bias to reduce the time required before communication between integrated circuits may begin.

A block diagram of a computing system is illustrated in FIG. 1. In the illustrated embodiment, the computing system 100 includes a CPU 101 coupled to Random Access Memory (RAM) 102, Read-only Memory (ROM) 103, and display adapter 104. CPU 101 is additionally coupled to input/output (I/O) adapter 105, user interface adapter 106, and communications adapter 107. In various embodiments, computing system 100 may be configured as a desktop system, a laptop system, or in any suitable form factor.

RAM 102 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one RAM is shown, in various embodiments, any suitable number of RAMs may be employed.

CPU 101 may implement any suitable instruction set architecture (ISA), such as, e.g., the ARM™, PowerPC™, or x86 ISAs, or combination thereof. In some embodiments, CPU 101 may include one or more processor cores configured to implement one of the aforementioned ISAs. CPU 101 may also include one or more cache memories which may be configured to store instructions and/or data during operation. In other embodiments, CPU 101 may include power management unit 110 which may be configured to process and manage requests for changes in the power status of system 100. For example, power management unit 110 may respond to a system request for entry into sleep mode by generating a sleep mode signal that may cause portions of CPU 101, such as bus transceiver unit 109, for example, to power down. In some embodiments, power management unit 110 may coordinate the orderly power up of CPU 101 by generating one or more power up signals each of which may activate a different portion of the circuits within CPU 101.

CPU 101 may include one or more bus transceiver units 109 that allow CPU 101 to connect to bus 108. In some embodiments, bus 108 may be a high-speed serial interface that may conform to an industry standard specification, such as, e.g., PCI Express™, or MIPI Physical Layer. In some embodiments, the various circuits block, such as, e.g., CPU 101, may be coupled to bus 108 through a capacitor (this is commonly referred to as being "AC coupled").

ROM 103 may be configured to store instructions to be executed by CPU 101. In some embodiments, ROM 103 may store instructions necessary for initial boot-up and configuration of CPU 101. The stored instructions may include, in some embodiments, instructions to perform a power-on self-test (POST) that may allow CPU 101 to test embedded cache memories and other circuit blocks that may reside on CPU 101. In some embodiments, ROM 103 may be mask-programmable using a metal, polysilicon, contact, implant, or any suitable mask layer available on a semiconductor manufacturing process.

I/O adapter 105 may be configured to coordinate data transfer between CPU 101 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O adapter 105 may be configured to implement a version of Universal Serial Bus (USB) protocol or IEEE 1394 (Firewire®) protocol.

Communication adapter 107 may be configured to coordinate data transfer between CPU 101 and one or more devices (e.g., other computer systems) coupled to CPU 101 via a network. In one embodiment, communication adapter 107 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, communication adapter 107 may be configured to implement multiple discrete network interface ports.

User interface adapter 106 may be configured to transfer data between one or more peripheral devices configured to input data into computing system 100. In one embodiment, user interface adapter 106 may receive input from a keyboard and transfer the data to CPU 101. In other embodiments, user interface adapter 106 may receive and format data from a mouse or other suitable pointing device.

Display adapter 104 may be configured to transfer and format data from between CPU 101 and a display screen. In some embodiments, display adapter 104 may be configured to implement a display standard such as Super-VGA or High-Definition Multimedia Interface (HDMI). In other embodiments, display adapter 104 may be configured to implement multiple display interfaces.

Figure 2:
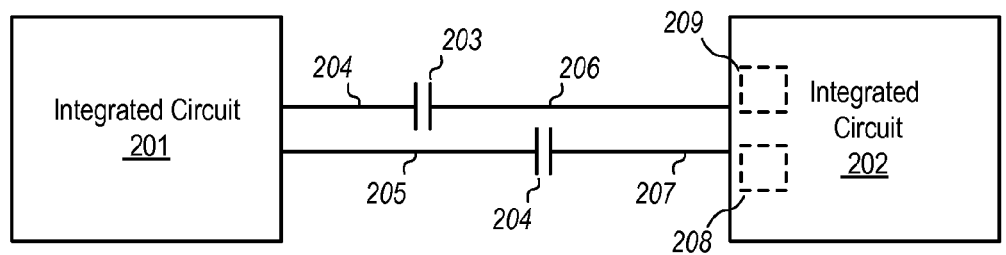
FIG. 2 illustrates an embodiment of an AC couple differential bus.

Turning to FIG. 2, an embodiment of a differential AC coupled bus is illustrated. In this embodiment, integrated circuit 201 is coupled to bus segments 204 and 205, which are, in turn, coupled to capacitors 203 and 204, respectively. Capacitors 203 and 204 are further coupled to bus segments 206 and 207, respectively. Bus segments 206 and 207 are further coupled to Integrated Circuit 202, which may contain transceiver units 208 and 209. Transceiver units 208 and 209 may, in various embodiments, operate solely as a receiver or transmitter. In some embodiments, bus segments 204, 205, 206, and 207 may correspond to bus 108 of FIG. 1. Furthermore, in some embodiments, integrated circuit 201 and integrated circuit 202 may correspond to one or more of the circuit blocks, such as, e.g., CPU 101, in FIG. 1. It is noted that, in some embodiments, multiple series capacitors may be employed on the bus connections between Integrated Circuit 201 and Integrated Circuit 202. In some embodiments, capacitor 203 and capacitor 204 may be film capacitors, electrolytic capacitors, ceramic capacitors, or any other suitable capacitor type.

During operation, capacitor 203 isolates the DC voltage level of bus segment 204 from the DC voltage level of bus segment 206. In a similar fashion, capacitor 204 isolates the DC voltage level of bus segment 205 from the DC voltage level of bus segment 207. Capacitors 203 and 204, however, provide a low impedance for high frequency or AC signals allowing such signals to be superimposed on top of the DC voltage level of a bus segment. For example, a high frequency signal superimposed on the DC voltage level of bus segment 204 may be coupled to bus segment 206 and superimposed on the DC voltage level of bus segment 206. Dependent upon the frequency of the signal to be coupled between bus segments, different values for capacitors 203 and 204 may be employed.

In some embodiments, the DC voltage levels of the bus segments may be different. In other embodiments, bus segments 204, 205, 206, and 207 may be differentially encoded. In such cases, bus segments 204 and 205 may jointly encode a data state transmitted by integrated circuit 201 as the difference in the small signal voltages on the two bus segments. The high frequency component of the signals on bus segments 204 and 205 are coupled to bus segments 206 and 207, respectively. Integrated circuit 202 may be configured to provide a DC voltage to bus segments 206 and 207 such that the DC level of bus segments 206 and 207 is equal to the common mode operating point of a differential amplifier configured to amplify the difference between bus segments 206 and 207, thereby retrieving the differentially encoded data. It is noted that FIG. 2 is merely an example and that other AC coupled bus structures are possible and contemplated.

Figure 3:
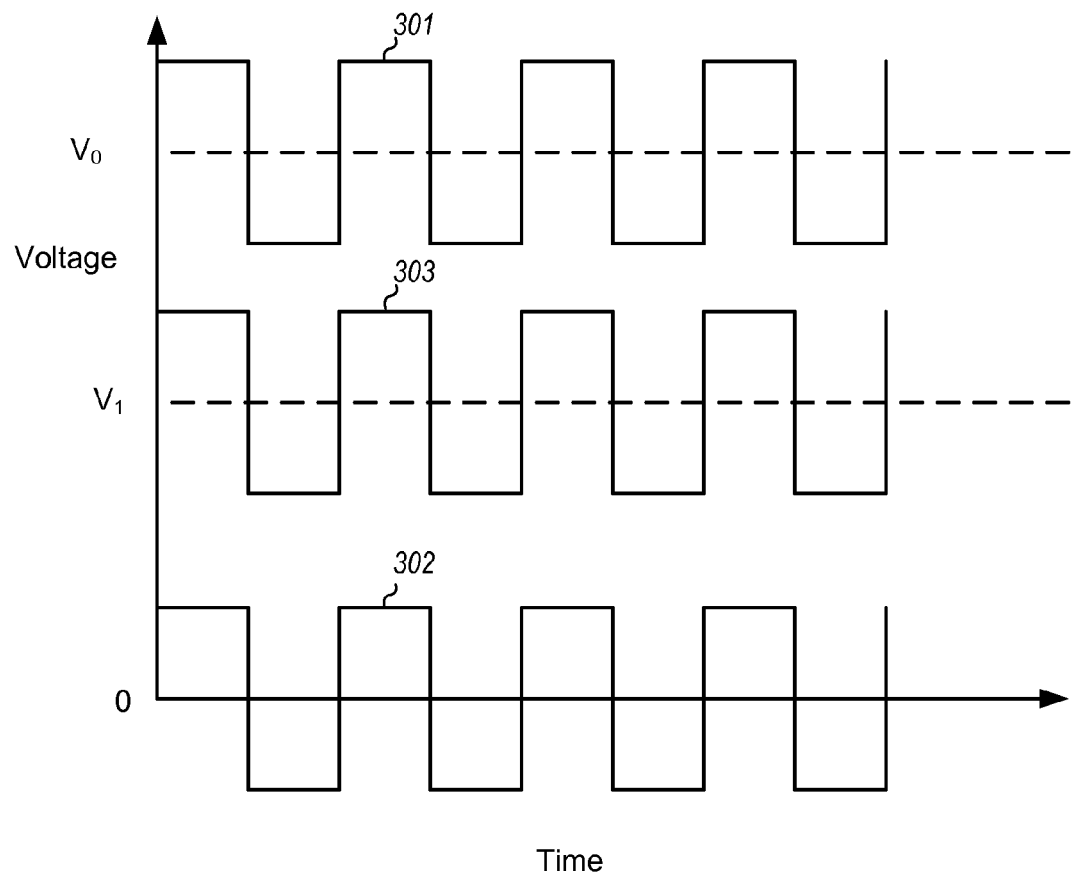
FIG. 3 illustrates possible waveforms of AC coupled bus.

Turning to FIG. 3, possible waveforms for the AC couple bus as depicted in the embodiment illustrated in FIG. 2. Referring collectively to the embodiment illustrated in FIG. 2 and the waveforms depicted in FIG. 3, voltage waveform 301 may correspond to the voltage on bus segment 204 of FIG. 2, and voltage waveform 302 may correspond to the voltage on bus segment 206 of FIG. 2.

Integrated circuit 201 drives bus segment 204 generating a signal whose voltage swing is centered about voltage $V_0$ (waveform 301). As described above, the value of capacitor 203 is selected such that the DC component of the signal (voltage $V_0$) is not passed to bus segment 206, resulting in waveform 302. In some embodiments, integrated circuit 202 may apply a DC voltage level to bus segment 206. In such cases, the high frequency portion of the signal on bus segment 204 may be coupled onto bus segment 206 such that the voltage swing of the signal on bus segment 206 may be centered at the DC level applied, such as voltage $V_1$ illustrated in FIG. 3, to bus segment 206 by integrated circuit 202 (waveform 303). Although two DC voltage levels are illustrated in FIG. 3, in other embodiments, other DC voltage levels may be possible.

Figure 4:
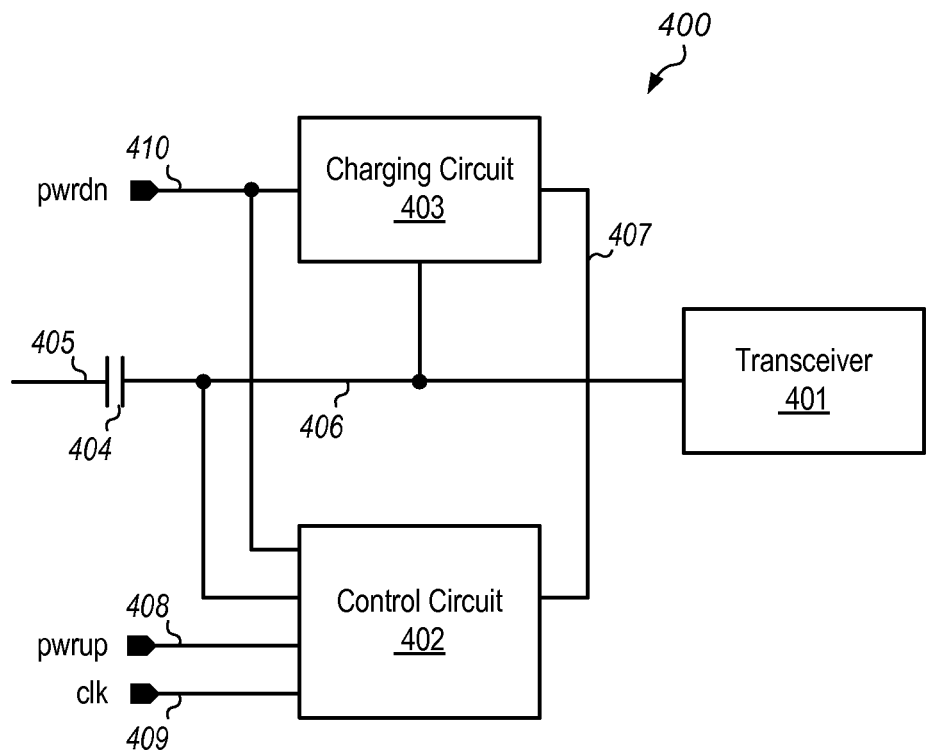
FIG. 4 illustrates an embodiment of an AC coupled bus charging system.

FIG. 4 illustrates an embodiment of an AC coupled bus charging system. Such a system may be included in one or more of the circuit blocks of computing system 101 illustrated in FIG. 1, such as CPU 101, for example. Bus segment 405 is coupled to capacitor 404, which in turn, is coupled to bus segment 406. Transceiver 401, charging circuit 403, and control circuit 402 are further coupled to bus segment 406. Control circuit 402 outputs current control signal 407, which is input to charging circuit 403. Charging circuit 403 and control circuit 402 receive power-down signal 410 denoted as "pwrdn." Control circuit 402 further receives clock signal 409 denoted as "clk" and power-up signal 408 denoted "pwrup."

Transceiver 401 may be configured to amplify the voltage level on bus segment 406. For example, transceiver 401 may be able to amplify the signaling voltages specified by the low-voltage transistor-transistor logic (LVTTL), low-voltage complementary metal-oxide semiconductor (LVCMOS), or low-voltage differential signaling (LVDS) interface standards. In some embodiments, transceiver may employ a level shift circuit to translate the voltage level of bus segment 406 to a different level for use inside of an integrated circuit, such as integrated circuit 202 as illustrated in FIG. 2, for example. In other embodiments, bus segment 406 may be differentially encoded and transceiver 401 may be configured to amplify the differentially encoded data.

Control circuit 402 may be configured to compare the voltage level on bus segment 406 against a pre-determined level, and assert current control signal 407. For example, control circuit 402 may, in some embodiments, include a voltage comparator, a differential amplifier and a voltage reference, or other suitable comparator circuit. In other embodiments, control circuit 402 may be configured to assert current control signal 407 a delay period after the assertion of pwrup 408. Control circuit 402 may contain a counter configured to count clock cycles of clk 409, and assert current control signal 407 after a pre-determined number of clock cycles have been detected. It is noted that in some embodiments, control circuit 402 may be configured to generate more than one control signal. In such cases, the assertion of each control signal may be dependent upon different criteria, such as, e.g., the voltage on bus segment 406 achieving a pre-determined level.

Charging circuit 403 may be configured to source current bus segment 406. In some embodiments, charging circuit 403 may source current to bus segment 406 in response to the assertion of control signal 407. In other embodiments, charging circuit 403 may source one or more currents to bus segment 406, where each current may be controlled by a respective control signal. Charging circuit 403 may also, in some embodiments, be configured to sink current from bus segment 406. For example, charging circuit 403 may sink current from bus segment 406 in response to the assertion of pwrdn 410.

Figure 5:
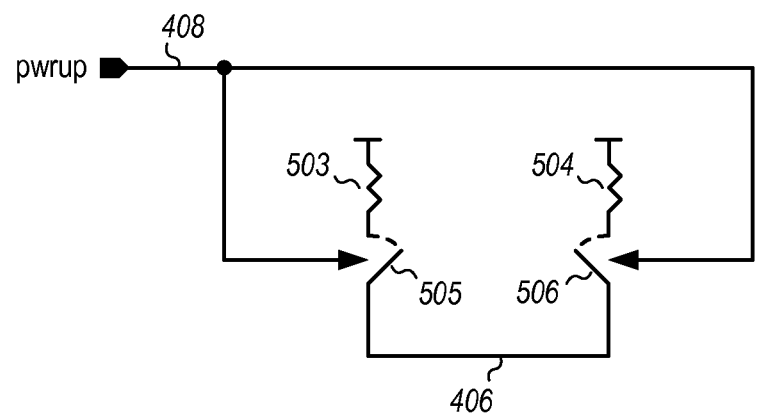
FIG. 5 illustrates an embodiment of an AC coupled bus charging circuit.

FIG. 5 illustrates a possible embodiment of bus charging circuit 402 as illustrated in FIG. 4. Bus segment 406 is coupled to switches 505 and 506. Switch 505 is further coupled to resistor 503 and is controlled by pwrup 408, and switch 506 is further coupled to resistor 504 and is controlled by pwrup 408. Resistors 503 and 504 are further coupled to the power supply.

In some embodiments, resistors 503 and 504 may reside on an integrated circuit, such as, e.g., integrated circuit 202 illustrated in FIG. 2, Resistors 503 and 504 may be constructed from polycrystalline silicon, N-type or P-type diffused silicon, copper or aluminum metal, or any other suitable material available on a semiconductor manufacturing process. In other embodiments, resistors 503 and 504 may be implemented using transistors biased to provide a fixed impedance (commonly referred to as "active resistors"). Resistors 503 and 504 may, in some embodiments, be configured to provide different impedances while, in other embodiments, resistors 503 and 504 may be configured to provide the same impedance.

Switches 505 and 506 may be implemented using transistors, silicon-controlled rectifiers, diodes, or any other suitable switching element. It is noted that that, in various embodiments, a "transistor" may correspond to one or more transconductance elements such as a junction field-effect transistor (JFET), or a metal-oxide-semiconductor field-effect transistor (MOSFET), for example.

During power-up operation, pwrup 408 may be asserted which may close switch 505, coupling resistor 503 to bus segment 406. The assertion of pwrup 408 may open switch 506, thereby isolating resistor 504 from bus segment 406. With switch 505 closed, a current may flow through resistor 503, supplying charge to bus segment 406, thereby increasing the voltage level on bus segment 406.

At some time later, switch 505 may be opened and switch 506 may be closed, coupling resistor 504 to bus segment 406. As will be discussed further below, the change in switch position may be a function of the voltage level on bus segment 406, or a time delay from the assertion of pwrup 408. A current may flow through resistor 504, supplying additional charge to bus segment 406. In some embodiments, the values of resistors 503 and 504 may be different, resulting in differing currents when the resistors are coupled to bus segment 406. During power down, both switch 505 and switch 506 may be open to allow the charge on bus segment 406 to leak off through other circuit elements coupled to bus segment 406. It is noted that other numbers and configurations of circuit elements may be possible in alternative embodiments.

Figure 6:
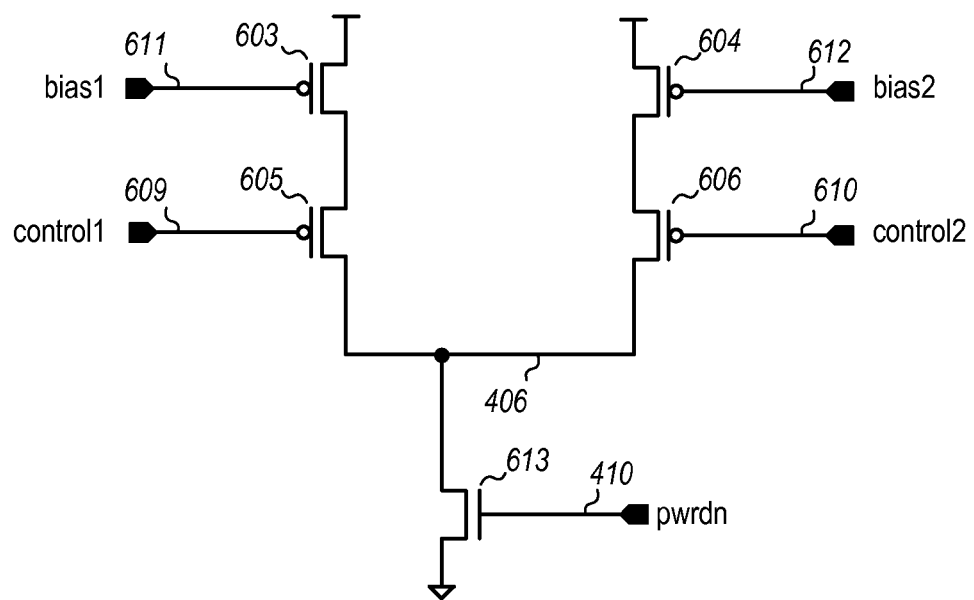
FIG. 6 illustrates an alternative embodiment of an AC coupled bus charging circuit.

Turning to FIG. 6, an alternative embodiment of a bus charging circuit 402 is illustrated. Bus segment 406 is coupled to control transistors 605 and 606, and pull-down transistor 613. Control transistor 605 is further coupled to bias transistor, and control transistor 606 is coupled to bias transistor 604. Pull-down transistor 613 is controlled by pwrdn 410. Control transistors 605 and 606 are controlled by control1 609 and control2 610, respectively, and bias transistors 603 and 406044 are controlled by bias1 611 and bias2 612, respectively. In some embodiments, bias1 611 and bias2 612 may be at different analog voltage levels, and may be generated using a supply and temperature independent bias circuit employing one or more current mirrors or any other suitable analog voltage generator circuit.

During power-up operation, control1 609 and control2 610 are both initially set high turning off control transistors 605 and 606. As the power-up operation continues, control1 609 may be set to low, turning on control transistor 605. The current generated by bias transistor 603 may then flow onto bus segment 406, thereby increasing the voltage level on bus segment 406. In some embodiments, the current generated by bias transistor 603 may be sufficiently large to rapidly charge bus segment 406. It is noted that in this embodiment, low refers to a voltage at or near ground potential and high refers to a voltage sufficiently large to turn on n-channel MOSFETs and turn off p-channel MOSFETs. In other embodiments, other circuit configurations may be used and the voltages that constitute low and high may be different.

At some time later, control1 609 may be switched high, turning off control transistor 605, and control2 610 may be switched low, turning on control transistor 606. The current generated by bias transistor 604 may then flow onto bus segment 406. In some embodiments, the current generated by bias transistor 604 may be sufficient to maintain an existing voltage level on bust segment 406 by providing just enough current to overcome leakages from bus segment 406. Such a current level may be referred to as a trickle current.

In some embodiments, the time delay between when control1 609 is set low to when control2 610 is set low may be dependent upon the voltage level on bus segment 406. For example, as described above with respect to control circuit 402 illustrated in the embodiment depicted in FIG. 4, control circuit 402 may employ a comparator circuit to check the voltage level on bus segment 406 against a pre-determined voltage level, and when the pre-determined voltage level is achieved, switch the voltage levels of control1 609 and control2 610. The pre-determined voltage level may, in some embodiments, correspond to the voltage level achieved after one or more time constants associated with capacitor 404 and any associated wiring resistances, while in other embodiments, a sufficiently large voltage level to allow for proper operation of transceiver 401 may be used as the pre-determined voltage level.

In other embodiments, a timing circuit may control the time delay between when control1 609 is set low to when control2 610 is set low. For example, as described above in reference to control circuit 402, a counter which increments on each rising edge of clk 409 may be used to determine when to change the state of the control signals. Alternatively, an analog timing circuit based on the time constant of an RC circuit may be employed to generate the time delay.

In an alternative embodiment, the aforementioned time delay may be dependent upon both a voltage level on bus segment 406 and a delay generated by a timing circuit. In other embodiments, bias 611 and bias 612 may be used in conjunction with control1 609 and control2 610 to modify the current sourced to bus segment 406. For example, after a time delay from activation of the bus charging circuit depicted in FIG. 6, the analog voltage level of bias 611 may be adjusted to reduce the current being sourced to bus segment 406. After a further time delay, control1 609 may be set high, isolating bias transistor 603, and control2 610 may be set low, coupling bias transistor 604 to bus segment 406. The analog voltage level of bias 612 may then be adjusted to reduce the current being sourced to bus segment 406, after another time delay.

During power down operation, both control1 609 and control2 610 are set high, turning off control transistors 605 and 606. Pwrdn 410 may then be asserted, turning on pull-down transistor 613, which discharges bus segment 406 to ground. It is noted that the number of transistors and connectivity shown in FIG. 6 are merely an illustrative example, and that in other embodiments, other numbers, types of transistors, and/or circuit configurations may be employed.

Figure 7:
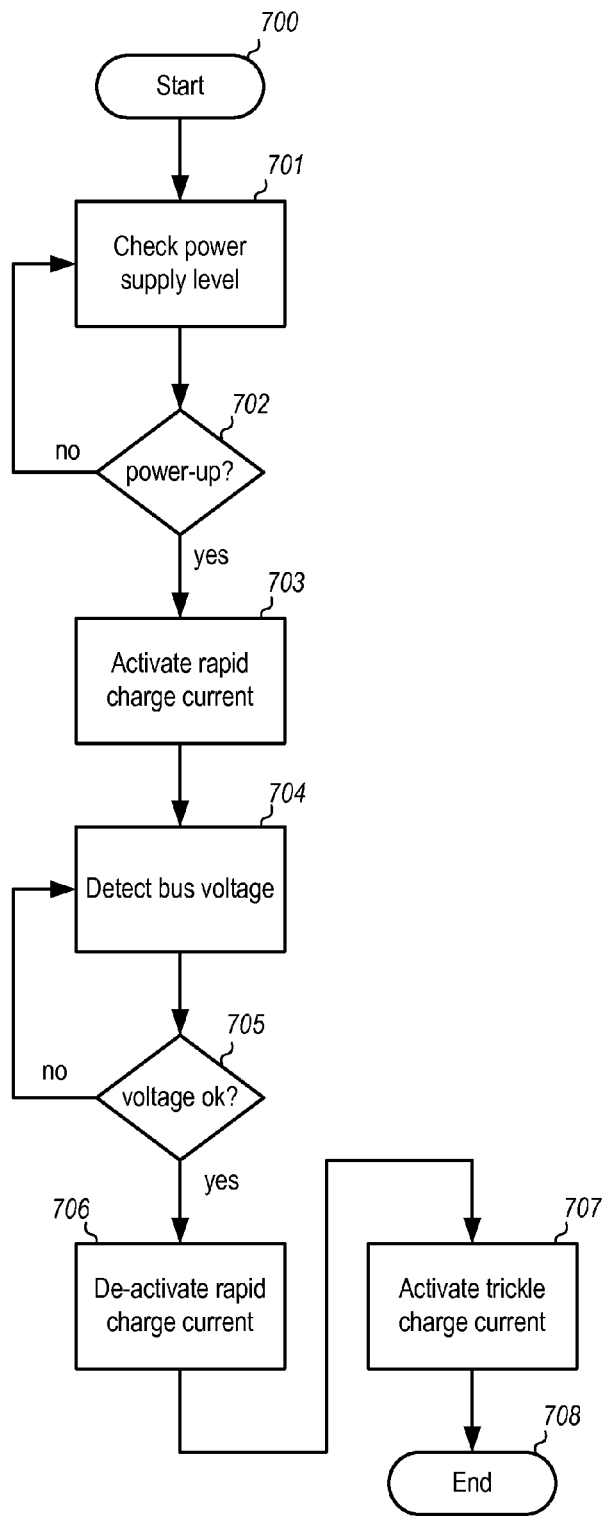
FIG. 7 illustrates a possible method of operating the embodiment of the AC coupled bus charging system depicted in FIG. 4.

A possible method of operating bus charging system 400 during operation is illustrated in FIG. 7. Referring collectively to FIG. 1, FIG. 4, and the flowchart illustrated in FIG. 7, the operation may begin in block 700. When power is applied to computing system 100, power management unit 110 monitors the voltage level of the power supply (block 701). The voltage level of the power supply is then checked to determine whether a power-up criterion satisfied (block 702). For example, the voltage level of the power supply may be checked to determine whether it is greater than (or possibly equal to) a pre-determined threshold voltage. When the power-up criterion is not yet satisfied, power management unit 110 continues to monitor the voltage level of the power supply (block 701).

When the power-up criterion is satisfied, pwrup 408 may be asserted which, in turn, may cause control circuit 402 to activate control signal 407 such that a rapid charge current may be sourced to bus segment 406 (block 703). The rapid charge current may be generated by the charging circuit illustrated in FIG. 6, or any other suitable current generate circuit such as, e.g., a current mirror.

Control circuit 402 then monitors the voltage level on bus segment 406 (block 704). The voltage level on bus segment 406 is then checked to determine whether a termination condition for the rapid charging is satisfied (block 705). For example, the voltage level on bus segment 406 may be checked to determine whether it is greater than (or possible equal to) a pre-determined reference voltage value. When the termination condition is not yet satisfied, the rapid charging continues and control circuit 402 continues to monitor the voltage level on bus segment 406 (block 704).

When the termination condition is satisfied, the rapid charge current may then be de-activated (block 706). Once the rapid charge current is de-activated, a trickle charge current may then be activated to maintain the voltage level on bus segment 406 (block 707). The trickle charge current may be generated by the charging circuit illustrated in FIG. 6, or any other suitable current generation circuit such as, e.g., a current mirror. Once the trickle charge current has been activated, the operation ends (block 708). The trickle current may remain active until a sleep signal is activated or a power down situation is encountered.

Figure 8:
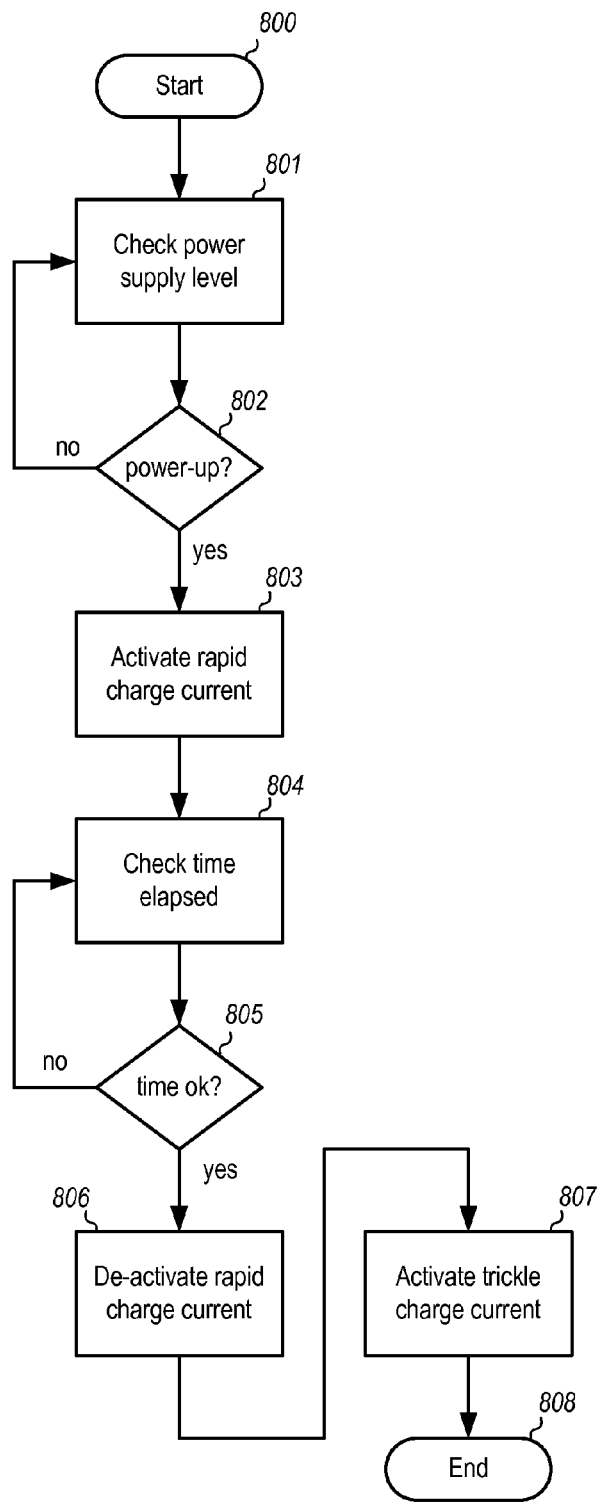
FIG. 8 illustrates a possible method of operating the embodiment of the AC coupled bus charging system depicted in FIG. 4.

Another possible method of operating bus charging system 400 during operation is illustrated in FIG. 8. Referring collectively to FIG. 1, FIG. 4, and the flowchart illustrated in FIG. 8, the operation may begin in block 800. When power is applied to computing system 100, power management unit 110 monitors the voltage level of the power supply (block 801). The voltage level of the power supply is then checked to determine whether a power-up criterion satisfied (block 802). For example, the voltage level of the power supply may be checked to determine whether it is greater than (or possibly equal to) a pre-determined threshold voltage. When the power-up criterion is not yet satisfied, power management unit 110 continues to monitor the voltage level of the power supply (block 801).

When the power-up criterion is satisfied, pwrup 408 may be asserted which, in turn, may cause control circuit 402 to activate control signal 407 such that a rapid charge current may be sourced to bus segment 406 (block 803). The rapid charge current may be generated by the charging circuit illustrated in FIG. 6, or any other suitable current generate circuit such as, e.g., a current mirror.

Control circuit 402 then monitors the elapsed time from the activation of the rapid charge current (block 804). The elapsed time may then be checked to determine whether a termination condition for the rapid charging is satisfied (block 805). For example, the elapsed time from the activation of the rapid charge current may be checked to determine whether it is greater than (or possible equal to) a pre-determined time period. When the termination condition is not yet satisfied, the rapid charging continues and control circuit 402 continues to monitor the elapsed time from the activation of the rapid charge current (block 804).

When the termination condition is satisfied, the rapid charge current may then be de-activated (block 806). Once the rapid charge current is de-activated, a trickle charge current may then be activated (block 807). The trickle charge current may be generated by the charging circuit illustrated in FIG. 6, or any other suitable current generation circuit such as, e.g., a current mirror. Once the trickle charge current has been activated, the operation ends (block 808). The trickle current may remain active until a sleep signal is activated or a power down situation is encountered.

Numerous variations and modifications will become apparent to those skilled in the art once the above disclosure is fully appreciated. It is intended that the following claims be interpreted to embrace all such variations and modifications.

What is claimed is:

1. An apparatus, comprising:
    a capacitively coupled input/output port of an integrated circuit;
    a control circuit configured to:
        detect a power up condition;
        generate a current control signal dependent upon the detected power up condition; and
        detect a threshold voltage level on the capacitively coupled input/output port of the integrated circuit; and
    a charging circuit configured to:
        source a rapid charge current or a trickle charge current to the input/output port dependent upon the current control signal; and
        source a trickle current to the capacitively coupled input/output port dependent upon the detected threshold voltage level.

2. The apparatus of claim 1, wherein the control circuit is further configured to select the trickle charge current in response to a determination that a delay period has elapsed since the detection of the power up condition.

3. The apparatus of claim 2, wherein the rapid charge current is larger than the trickle charge current.

4. The apparatus of claim 1, wherein the charging circuit is further configured to sink a current from the input/output port dependent upon a power down signal.

5. A method comprising:
    detecting a power up condition on an integrated circuit;
    sourcing a rapid charge current to a capacitively coupled input/output port of the integrated circuit in response to the detection of the power up condition;
    detecting a threshold voltage level on the capacitively coupled input/output port of the integrated circuit; and
    sourcing a trickle current to the capacitively coupled input/output port dependent upon the detected threshold voltage level.

6. The method of claim 5, wherein the detecting the threshold voltage level comprises comparing a voltage level on the capacitively coupled input/output port of the integrated circuit to a pre-determined goal voltage.

7. The method of claim 5, further comprising, dependent upon the detected threshold voltage, de-activating the rapid charge.

8. The method of claim 5, further comprising detecting a power down condition, and sinking a current from the capacitively coupled input/output port dependent upon the detected power down condition.

9. The method of claim 8, further comprising de-activating the rapid charge current and the trickle charge current dependent upon the detected power down condition.

10. A system, comprising:
    one or more memories; and
    a processing unit, wherein the processing unit comprises:
        one or more capacitively coupled input/output ports;
        one or more transceiver circuits, wherein each given one of the one or more transceiver circuits is coupled to a respective one of the one or more capactively coupled input/output ports;
        one or more charging circuits, wherein each given one of the one or more charging circuits is configured to:
            source a rapid charge current to a respective one of the one or more capacitively coupled input/output ports dependent upon a power up signal; and
            source a trickle charge current to the respective one of the one or more capacitively coupled input/output ports dependent upon a delay from activation of the power up signal.

11. The system of claim 10, wherein each given one of the one or more charging circuits comprises a control circuit configured to compare the voltage level on the respective one of the input/output ports to a pre-determined reference voltage.

12. The system of claim 10, wherein at least one of the one or more transceiver circuits is configured to receive differentially encoded data.

13. The system of claim 10, wherein each given one of the one or more charging circuits comprises a control circuit configured to generate the delay from activation of the power up signal.

14. The system of claim 10, wherein each charging circuit is further configured, dependent upon a power down signal, to sink a current from a respective one of the input/output ports.

15. A method comprising:
    detecting a power up condition on an integrated circuit;
    sourcing a rapid charge current to a capacitively coupled input/output port of the integrated circuit in response to the detection of the power up condition;
    sourcing a trickle current to the capacitively coupled input/output port after a delay period from the detection of the power up condition.

16. The method of claim 15, wherein the delay period is dependent upon the detection of a pre-determined number of clock cycles.

17. The method of claim 15, the delay is dependent upon the charging of a capacitor using a reference current.

18. The method of claim 15, wherein the rapid charge current is larger than the trickle charge current.

19. The method of claim 15, further comprising detecting a power down condition on the integrated circuit, and sinking a current from the capacitively coupled input/output port of the integrated circuit in response to the detection of the power down condition.

20. A processor, comprising:
   a power management circuit configured to detect a power on request;
   one or more capacitively coupled input/output ports;
   wherein the power management circuit is further configured to detect a threshold voltage level on the at least one of the one or more capacitively coupled input/output ports; and
   one or more charging circuits wherein each given one of the one or more charging circuits is configured to:
      source a rapid charge current to a respective one of the one or more capacitively couple input/output ports in response to the detected power on request; and
      source a trickle current to the respective one of the one or more capacitively coupled input/output ports dependent upon the detected threshold voltage level.

21. The processor of claim 20, wherein each given one of the one or more charging circuits is further configured to sink a current from the respective one of the one or more capacitively coupled input/output ports after a delay from the detected power on request.

22. The processor of claim 20, wherein the power management circuit is configured to detect a sleep mode request.

23. The processor of claim 22, wherein each given one of the one or more charging circuits is further configured to sink a current from the respective one of the one or more capacitively coupled input/output ports dependent upon the detection sleep mode request.

* * * * *